United States Patent [19]

Arora

[11] 4,381,231
[45] Apr. 26, 1983

[54] DC ETCHING OF ALUMINUM ELECTROLYTIC CAPACITOR FOIL

[75] Inventor: Mulk R. Arora, Williamstown, Mass.

[73] Assignee: Sprague Electric Company, North Adams, Mass.

[21] Appl. No.: 321,510

[22] Filed: Nov. 16, 1981

[51] Int. Cl.³ .............................................. C25F 3/04
[52] U.S. Cl. .......................... 204/129.75; 204/129.95
[58] Field of Search ...................... 204/129.75, 129.95

[56] References Cited

U.S. PATENT DOCUMENTS 3,085,950 4/1963 Thomas et al. ...................... 204/141
3,755,115 8/1973 Van Herwijnen et al. .... 204/129.75
4,198,278 4/1980 Mehada et al. ................ 204/129.75

FOREIGN PATENT DOCUMENTS 52-133043 11/1977 Japan.
52-141444 11/1977 Japan.

Primary Examiner—T. M. Tufariello

[57] ABSTRACT

Aluminum electrolytic capacitor foil is etched by passing the foil through an electrolyte bath containing 2.5 moles/liter of sodium chloride and 0.08 to 0.48 moles/liter of boric acid or 0.05 to 0.07 moles/liter of a citrate ion source under the influence of direct current and at a temperature of 90° to 95° C. The foil thus etched has a central metallic core which results in improved mechanical properties.

5 Claims, 2 Drawing Figures

DC ETCHING OF ALUMINUM ELECTROLYTIC CAPACITOR FOIL

BACKGROUND OF THE INVENTION

This invention relates to the etching of aluminum electrolytic capacitor foil in an etching bath containing sodium chloride and boric acid or citrate ion source using direct current at 90°-95° C. to produce a foil that has a central metallic core and improved mechanical properties.

Etching of aluminum capacitor foil using direct current and a sodium chloride electrolyte bath is known. However, direct current etching has the disadvantage of mechanically weakening the foil because the tunnels formed by the etching penetrate deeply into the foil. Various remedies have been proposed, including alloying the aluminum with small amounts of other metals to make the foil more reactive to increase etch pit density and more easily etched without removing large amounts of aluminum which weakens the foil.

Still other processes use varying amounts of passivating agents or corrosion inhibitors to prevent dissolution of the foil surface while permitting deeper etching of the foil. Some of these agents have been found to have detrimental effects in subsequent processing of the foil.

SUMMARY OF THE INVENTION

This invention features the etching of aluminum capacitor foil to produce a more uniformly etched foil with a metallic core and etching the foil under the influence of DC current in an electrolyte bath containing 2.5 moles/liter (150 g/l) of sodium chloride and 0.08 to 0.48 moles/liter (5-30 g/l) of boric acid or 0.05 to 0.07 moles/liter of a citrate ion source at 90°-95° C.

The chemistry of the etch electrolyte was found to be a major factor controlling etch characteristics of DC etching of aluminum for low voltage, e.g. up to 200 V, anode foils.

Of all the additives tried, boric acid in amounts of 5-30 g/l, preferably 10-30 g/l, gave an etched foil with a relatively thick and uniform metallic core and acceptable capacitance values. The tensile strength of the foils etched by the process of this invention is about 20-25% greater and the percent elongation about 300-400% greater than the present commercial product. Similar results were obtained with citric acid or citrate as additive.

Sodium chloride is used in preference to other chlorides (including hydrochloric acid) as it provides a fairly neutral solution from which the aluminum ions produced by the etching can be easily removed as aluminum hydroxide by a filter press and the sodium chloride solution can be recycled repeatedly.

The temperature is maintained at no greater than 95° C. as above that temperature the etching became more chemical in nature rather than electrochemical and evaporation losses became significant. Tunnel formation takes place at about 60° C. and above (in neutral solutions) with 90°-95° C. being optimum with the above etching electrolyte.

DESCRIPTION OF THE PREFERRED EMBODIMENTS

Figure 1A:
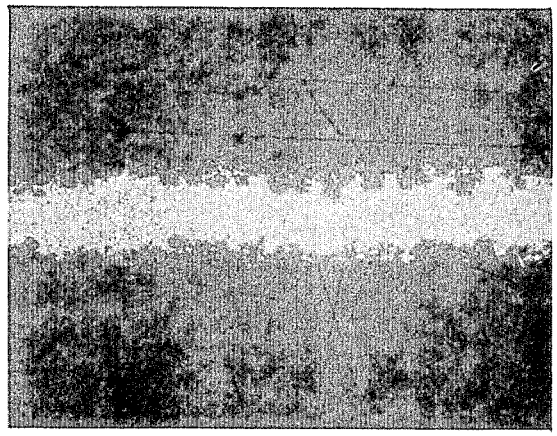
FIG. 1a is a microphotograph at 200× magnification of a cross-section of foil etched by the present invention.
Figure 1B:
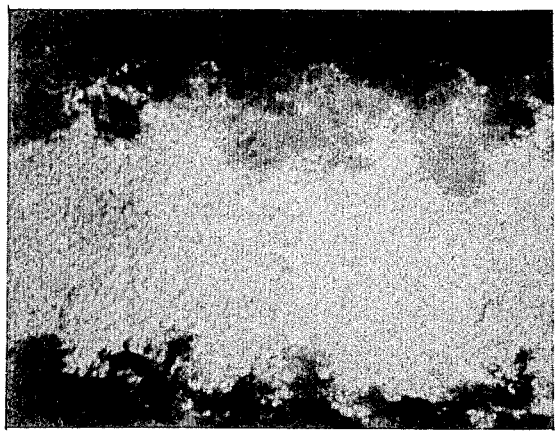
FIG. 1b is the same foil but at 725× magnification.

Aluminum electrolytic capacitor foil of at least 99.96% purity is etched by passing it through an etching electrolyte bath containing 150 g/l (2.56 moles/liter) of sodium chloride and 5-30 g/l (0.08-0.48 moles/liter) of boric acid under the influence of DC current at 90°-95° C. to provide an etched foil with a metallic core as shown by the microphotographs in FIG. 1a at 200× and in FIG. 1b at 725× magnification.

The Figures show a cross-section of etched foil mounted on a plastic mounting mat (scored background) for photographing. The feathery structure is the etched structure of the foil, and the boundary surfaces of the foil are discernable above and below the etch structure against the mounting mat. In contrast to the prior art use of inhibitors or passivating agents to prevent dissolution of the foil surfaces while permitting etching in depth, foil produced by the present invention has a central metallic core, the bright region in the center of the Figures, and a highly etched surface. FIG. 1b shows the etch structure in greater detail while FIG. 1a shows its relationship to the metallic core that provides better mechanical properties than heretofore possible with straight DC etching of aluminum foil.

EXAMPLE 1

In the following table, the effect of adding various amounts of boric acid to a sodium chloride etchant solution is shown. The solution contains 150 g/l (2.56 moles/liter) of sodium chloride and the amounts of boric acid shown. Capacitance is expressed as $\mu F/in^2$ of foil at the formation voltages indicated. The aluminum foil used was 3.5 mil (0.009 cm) thick, hard foil; current density was 5 $A/in^2$ and total charge passed was 500-540 coulombs.

TABLE 1a

| Boric Acid | Wt. Loss, % | Capacitance | | | |
|---|---|---|---|---|---|
| | | 10V | 60V | 120V | 180V |
| 0.0 g/l | 29.6 | 222 | 34.1 | 13.1 | 6.85 |
| 10 g/l | 34.2 | 270 | 45.5 | 16.4 | 8.52 |
| 20 g/l | 33.3 | 280 | 45.0 | 17.1 | 9.50 |
| 30 g/l | 31.3 | 317 | 43.6 | 15.3 | 7.67 |

As the data show, better 10 V capacitance was obtained at 30 g/l (0.48 moles/liter) of boric acid while greater capacitance values for the higher formation voltages are obtained at 10-20 g/l (0.16-0.32 moles/liter) of boric acid. Other experiments have shown that the use of 5 g/l (0.08 moles/liter) boric acid gives acceptable capacitance values and the metallic core, but that above 30 g/l of boric acid, there is little significant improvement over the above results.

In the following table, the ultimate tensile strength (UTS) and percent elongation is given for two groups of etched foil which was annealed after etching. The results are an average of eight samples in each group. Group I are samples that were cleaned before annealing to remove etchant and Group II are samples that were not cleaned before annealing.

TABLE 1b

| Group | Wt. Loss, % | Capacitance | | | | UTS psi | % Elong. |
|---|---|---|---|---|---|---|---|
| | | 10V | 60V | 120V | 180V | | |
| I | 30.5 | 305 | 42.5 | 15.1 | 7.45 | 4945 | 8.9 |

TABLE 1b-continued

| Group | Wt. Loss, % | Capacitance 10V | 60V | 120V | 180V | UTS psi | % Elong. |
|---|---|---|---|---|---|---|---|
| II | 27.0 | 288 | 38.3 | 12.0 | 5.44 | 5203 | 9.3 |

As the above data shows, there was no significant difference in mechanical properties between the groups. Capacitance was higher, however, when the foil was cleaned of etchant before annealing.

EXAMPLE 2

Similar results were obtained using citric acid or a salt of citric acid instead of the boric acid at the same concentrations as above and 4–5 A/in$^2$ with other conditions the same. There was less variation in low vs high voltage capacitance with the citrate ion than with the borate ion. In the following table, samples 1–4 were etched using the sodium chloride electrolyte containing 10 g/l (0.05 mole/liter) of citric acid and samples 5–8 were etched using 20 g/l (0.07 mole/liter) of sodium citrate as additive. In addition, for samples 1, 2, 5, and 6 the current density was about 5 A/in$^2$ vs about 4 A/in$^2$ for the others.

The current density used is a function of the particular additive used and the capacitance desired at a particular formation voltages. Generally, higher current densities produce more etch pits, necessary for low formation voltages while few pits are required for higher voltages. The citrate ion led to satisfactory capacitance even at the low voltage end of the scale so that lower current densities could be used.

TABLE 2

| Sample | Wt. loss, % | Capacitance 10V | 60V | 120V | 180V | UTS, psi | % Elong. |
|---|---|---|---|---|---|---|---|
| 1 | 36.7 | 358 | 47.7 | 17.6 | 8.44 | 4970 | 7.2 |
| 2 | 37.1 | 391 | 47.7 | 17.9 | 9.17 | 4150 | 7.2 |
| 3 | 35.4 | 338 | 46.6 | 17.1 | 8.58 | 3740 | 3.6 |
| 4 | 43.5 | 342 | 47.2 | 16.1 | 7.78 | 3860 | 5.2 |
| 5 | 38.4 | 367 | 56.0 | 18.9 | 9.05 | 4660 | 5.6 |
| 6 | 37.0 | 372 | 51.2 | 17.4 | 8.50 | 4160 | 3.6 |
| 7 | 36.9 | 350 | 50.0 | 18.8 | 8.69 | 4270 | 3.2 |
| 8 | 38.6 | 388 | 53.8 | 19.7 | 9.82 | 3410 | 1.6 |

The charge passed, number of coulombs, depends on the thickness of the foil being etched and the mechanical properties of the foil. In the examples above, the foil was 3.5 mil foil, and the charge passed was 500–540 coulombs.

While boric acid was used and was the preferred material because of availability, borax or other borate ion source could be used instead as it is the borate ion in solution that is the operative species. The amount of sodium chloride used was that of a standard sodium chloride etch solution commonly used.

What is claimed is:

1. A process for etching aluminum electrolytic capacitor foil comprising passing the foil through an electrolyte bath containing substantially 2.5 moles/liter of sodium chloride and a compound selected from the group consisting of boric acid and citrate ion source, wherein the concentration of said compound is 0.08 up to 0.48 moles/liter of boric acid and 0.05 to 0.07 moles/liter of citrate ion source under the influence of direct current at a temperature of 90° to 95° C. and a charge passed of 500 to 540 coulombs to provide an etched foil with a central metallic core.

2. A process according to claim 1 wherein the anodic current density is about 4 A/in$^2$ to 5 A/in$^2$.

3. A process according to claim 1 wherein the amount of said boric acid is 0.32 to 0.48 moles/liter.

4. A process according to claim 1 wherein the citrate ion source is citric acid.

5. A process according to claim 1 wherein the citrate ion source is sodium citrate.

* * * * *